US008656338B2

(12) United States Patent
Koushanfar et al.

(10) Patent No.: US 8,656,338 B2
(45) Date of Patent: *Feb. 18, 2014

(54) HARDWARE SYNTHESIS USING THERMALLY AWARE SCHEDULING AND BINDING

(71) Applicant: Empire Technology Development LLC, Wilmington, DE (US)

(72) Inventors: Farinaz Koushanfar, Houston, TX (US); Miodrag Potkonjak, Los Angeles, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/751,811

(22) Filed: Jan. 28, 2013

(65) Prior Publication Data

US 2013/0145335 A1    Jun. 6, 2013

Related U.S. Application Data

(62) Division of application No. 12/685,114, filed on Jan. 11, 2010, now Pat. No. 8,365,131.

(51) Int. Cl.
*G06F 17/50* (2006.01)

(52) U.S. Cl.
USPC ........... 716/133; 716/104; 716/118; 716/125; 716/132

(58) Field of Classification Search
USPC ........................ 716/104, 118, 125, 132–133
See application file for complete search history.

(56) References Cited

U.S. PATENT DOCUMENTS

| 5,541,849 | A * | 7/1996 | Rostoker et al. ............... 716/102 |
| 6,324,679 | B1 * | 11/2001 | Raghunathan et al. ........ 716/133 |
| 6,363,506 | B1 * | 3/2002 | Karri et al. ..................... 714/733 |
| 7,181,720 | B2 * | 2/2007 | Stammermann .............. 716/104 |
| 7,500,204 | B2 * | 3/2009 | Pineda De Gyvez et al. 716/133 |
| 7,552,346 | B2 | 6/2009 | Aguilar, Jr. et al. |
| 7,596,430 | B2 | 9/2009 | Aguilar, Jr. et al. |
| 7,627,841 | B2 * | 12/2009 | Shakouri et al. .............. 716/136 |
| 8,365,131 | B2 | 1/2013 | Koushanfar et al. |

(Continued)

OTHER PUBLICATIONS

Alkabani et al., "Input Vector Control for Post-Silicon Leakage Current Minimization in the Presence of Manufacturing Variability", Jun. 8-13, 2008, DAC 2008, Anaheim, California, pp. 606-609.

(Continued)

*Primary Examiner* — Naum Levin
(74) *Attorney, Agent, or Firm* — Hope Baldauff, LLC

(57) ABSTRACT

Technologies are generally described for hardware synthesis using thermally aware scheduling and binding. Multiple versions of a hardware design may be generated, each having variations of schedule and binding results. The scheduling and binding may be performed such that thermal profiles of the multiple versions have thermal peaks that are distant between the versions. The increased physical distance between the thermal peaks of the versions can give the versions unique thermal characteristics. A schedule of rotation between the multiple versions of the design may be constructed such that the thermal profile of the integrated circuit balances out during operation. A linear programming framework may be used to analyze the multiple designs and construct a thermally aware rotation scheduling and binding. For example, the K most efficient versions may be selected and then durations for operating each version within a rotation may be determined.

20 Claims, 6 Drawing Sheets

(56) References Cited

U.S. PATENT DOCUMENTS

| | | | |
|---|---|---|---|
| 2004/0148498 A1 | 7/2004 | Circenis et al. | |
| 2006/0123368 A1* | 6/2006 | Pineda De Gyvez et al. | 716/6 |
| 2006/0168463 A1 | 7/2006 | Terechko et al. | |
| 2007/0143514 A1 | 6/2007 | Kaushik et al. | |
| 2007/0244676 A1* | 10/2007 | Shang et al. | 703/2 |
| 2007/0260894 A1 | 11/2007 | Aguilar, Jr. et al. | |
| 2009/0077508 A1 | 3/2009 | Rubin et al. | |
| 2011/0172984 A1 | 7/2011 | Cher et al. | |

OTHER PUBLICATIONS

Alkabani et al., "N-Variant IC Design: Methodology and Applications", Jun. 8-13, 2008, DAC 2008, Anaheim, California, pp. 546-551.

Alkabani et al., "N-Version Temperature-Aware Scheduling and Binding", Aug. 19-21, 2009, ISLPED '09, San Francisco, California, pp. 331-334.

Chandrakasan et al., "Optimizing Power Using Transformations", Jan. 1995, IEEE Transactions on Computer-Aided Design of Integrated Circuits and Systems, 14(1):12-31.

Hong et al., "Power Optimization of Variable-Voltage Core-Based Systems", Dec. 1999, IEEE Transactions on Computer-Aided Design of Integrated Circuits and Systems, 18 (12):1702-1714.

Huang et al., "HotSpot: A Compact Thermal Modeling Methodology for Early-Stage VLSI Design", May 2006, IEEE Transactions on Very Large Scale Integration (VLSI) Systems, 14(5):501-513.

Kirovski et al., "System-Level Synthesis of Low-Power Hard Real-Time Systems", Jun. 1997, DAC 1997, Anaheim, California, 6 pages.

Paci et al., "Exploring temperature-aware design in low-power mpsocs," 2006, Proceedings of the conference on Design, automation and test in Europe (DATE '06), pp. 838-843.

Raghunathan, et al. High-level power analysis and optimization. Kluwer Academic Publishers, 1998. Abstract.

Chu et al., "A matrix synthesis approach to thermal placement," Nov. 1998, IEEE Transactions on Computer-Aided Design and Integrated Circuits and Systems, 17(11):1166-1174.

Liao et al., "Temperature and supply voltage aware performance and power modeling at microarchitecture level," Jul. 2005, IEEE Trans. on CAD, 24(7): 1042-1053.

Lim et al., "Thermal-aware high-level synthesis based on network flow method," 2006, Proc. of the 4th Int'l Con. on Hardware/Software codesign and system synthesis, pp. 124-129.

Liu et al., "Accurate temperature-dependent integrated circuit leakage power estimation is easy," Apr. 2007, Proceedings of the Conference on Design, Automation and Test in Europe, pp. 1526-1531.

Long et al., "A self-adjusting clock tree architecture to cope with temperature variations," Nov. 4-8, 2007, Conference on Comp[uter-aided Design (ICCAD '07), San Jose, California, pp. 75-82. Abstract.

Macii et al., "High-level power modeling, estimation, and optimization," Nov. 1998, IEEE Transactions on Computer-aided Design of Integrated Circuits and Systems, 17(11): 1061-1079.

Mukherjee et al., "An integrated approach to thermal management in high-level synthesis," Nov. 2006, IEEE Trans. on VLSI, 14(11):1165-1174.

Ni et al., "Thermal-induced leakage power optimization by redundant resource allocation," 2006, Proc. of the 2006 IEEE/ACM Int'l Con. on Computer-aided Design, pp. 297-302.

Zhang, S. et al. "Approximation algorithm for the temperature-aware scheduling problem." in ICCAD, pp. 281{288, 2007.

Sankaranarayanan et al., "A case for thermal-aware foorplanning at the microarchitectural level," Oct. 2005. Journal of Instruction-Level Parallelism, 8: 1-16.

Skadron et al., "Temperature-aware microarchitecture" 2003, Proceedings of the 30th annual international symposium on computer architecture, 31(2): 2-13.

Shang, L. et al., "High-Level Synthesis Algorithms, chapter High-Level Synthesis Algorithms for Power and Temperature Minimization," pp. 285-297, Springer, 2008.

Banerjee, K. et al., Leakage and variation aware thermal management of nanometer scale Ics, In IMAPS-Workshop, Oct. 25-27 2004, pp. 6.

U.S. Office Action dated Jan. 26, 2012 in U.S. Appl. No. 12/685,114.

U.S. Notice of Allowance dated May 4, 2012 in U.S. Appl. No. 12/685,114.

U.S. Office Action dated Jun. 25, 2012 in U.S. Appl. No. 12/685,114.

U.S. Notice of Allowance dated Sep. 24, 2012 in U.S. Appl. No. 12/685,114.

International Search Report dated May 9, 2013 in International Application No. PCT/US2010/056526.

Avizienis, Algirdas, "The N-Version Approach to Fault-Tolerant Software", IEEE Transactions on Software Engineering, vol. SE-11, No. 12, Dec. 1985; pp. 1491-1501.

* cited by examiner

HARDWARE SYNTHESIS USING THERMALLY AWARE SCHEDULING AND BINDING

CROSS REFERENCE TO RELATED APPLICATIONS

The present application is a divisional of and claims priority to U.S. Non-Provisional patent application Ser. No. 12/685114, entitled "Hardware Synthesis Using Thermally Aware Scheduling And Binding" filed Jan. 11, 2010, now U.S. Pat. No. 8,365,131, the entire content of which is hereby incorporated herein by reference.

BACKGROUND

Unless otherwise indicated herein, the materials described in this section are not prior art to the claims in this application and are not admitted to be prior art by inclusion in this section.

Hardware designs for integrated circuits can be synthesized from high-level descriptions. For example, descriptions may be made at an algorithm level using hardware description languages or programming languages. The descriptions can be synthesized into designs at a module level, a register transfer level (RTL), a gate level, or a transistor level. A hardware design involving signal processing may be abstracted as a data flow graph (DFG).

Scheduling and binding are part of hardware synthesis. Scheduling involves partitioning functionality of a circuit into steps to be performed. For example, the steps can be states of a finite state machine (FSM) or operations performed on signal samples within a signal processing circuit. Binding maps functionality onto hardware resources within the integrated circuit.

Technology scaling to smaller integrated circuit feature sizes causes increases in power density or power consumed per unit area. Increases in localized power consumption within an integrated circuit can result in hot regions on the chip. Having regions of differing temperature introduces heat gradients. Heat gradients result in thermal stress that can increase chip aging due to negative bias temperature instability, electromigration, or gradual dielectric breakdown. These factors degrade circuit reliability. Performance of the chip may also diminish when increased temperature slows carrier mobility, lowers transistor switching speed, and increases interconnect resistance.

Many design and operational considerations for complex electronic systems attempt to reduce power consumption. However, power consumption optimization and thermal optimization are not interchangeable since power optimization attempts to minimize average power consumption, but may support the formation of local thermal hotspots. A critical hotspot can damage the chip without significantly increasing average power. Techniques for lowering static or dynamic power consumption at the chip level may reduce overall power usage while power gradients or hotspots may remain or even increase because of global power reduction attempts.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
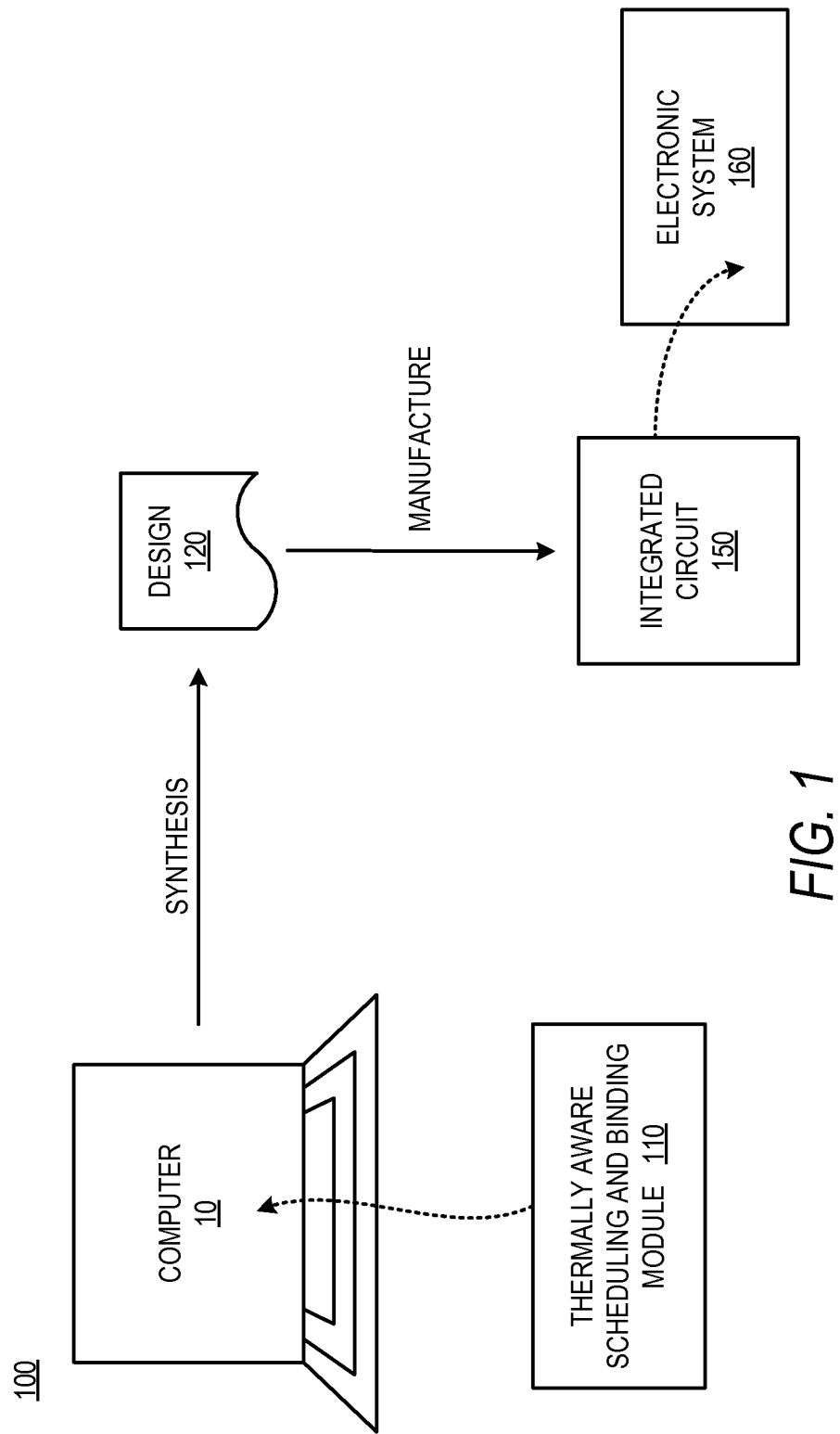
FIG. 1 is a block diagram illustrating a system for synthesizing an integrated circuit using thermally aware scheduling and binding.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein.

This disclosure is generally drawn, inter alia, to methods, apparatus, systems, and computer program products related to hardware synthesis using thermally aware scheduling and binding. The hardware being synthesized may be an integrated circuit. According to some embodiments, the integrated circuit may be an application specific integrated circuit (ASIC) such as a custom manufactured device or a masked device. According to some other embodiments, the integrated circuit may be a programmable device such as a complex programmable logic device (CPLD), a field programmable gate array (FPGA), or any other type of programmable logic device (PLD). It should be appreciated that the integrated circuit may be digital device, an analog device, or a mixed signal device.

Briefly stated, multiple versions of a design may be generated, each having variation of schedule and binding results according to various embodiments presented herein. For example, the scheduling and binding may be performed such that thermal profiles of the multiple versions have thermal peaks that are distant between the versions. The thermal profiles may also be referred to as thermal energy patterns or temperature patterns. The increased physical distance between the thermal peaks of the versions can give the versions unique thermal characteristics. A schedule of rotation between the multiple versions of the design may be constructed such that the thermal profile of the integrated circuit balances out during operation. The thermal characteristics of the integrated circuit may be referred to as thermal energy, heat energy, temperature, and/or generated heat energy. A linear programming framework may be used to analyze the multiple designs and construct a thermally aware rotation scheduling and binding. For example, the K most efficient versions may be selected and then durations for operating each version within a rotation may be determined. The technology discussed herein may seek to reduce a total temperature, peak temperature, total thermal energy, or peak thermal energy.

The multiple version scheduling and binding techniques described herein may be performed such that modules that are heavily used in one version are less utilized in one or more other versions. In some examples, the multiple versions may be simultaneously embedded into one design. During operation of the integrated circuit, the versions may be rotationally scheduled for operation such that each version would be used for a specified time duration. The rotational scheduling between thermally diverse versions may reduce local hotspots on the integrated circuit by balancing the rate of activity of the modules within the design. The phases for operating each version within the rotational schedule may be non-uniform in duration. A control mechanism for scheduling the multiple versions within one integrated circuit design may be provided at a low overhead.

FIG. 1 is a block diagram illustrating a system 100 for synthesizing an integrated circuit 150 with thermally aware scheduling and binding, arranged according to one or more embodiments presented herein. A computer 10 can be configured to execute software for synthesizing a hardware design 120. The computer 10 is discussed in additional detail with respect to FIG. 5. The software utilized by computer 10 can include a thermally aware scheduling and binding module 110. The thermally aware scheduling and binding module 110 can be utilized to implement the methods, processes, and techniques disclosed herein.

The hardware design 120 can specify a hardware solution for the integrated circuit 150 that rotates between multiple scheduling and binding versions where each version is thermally diverse. Operation of the integrated circuit 150 such that the multiple, thermally diverse versions are rotationally scheduled can balance the regions of peak temperature within the integrated circuit 150. This balancing can reduce thermal gradients within the integrated circuit 150 in comparison to using a design having only one of the versions.

The integrated circuit 150 may implement part or all of a signal processing algorithm for use in an electronic system 160. Such signal processing may include coding, decoding, or transcoding for audio, video, radar, medical imaging, communication signals, or any other signal. Alternatively, the signal processing may include compression, expansion, verification, encryption, decryption, transformation, filtering, upconverting, downconverting, interpolation, decimation, scaling, equalizing, or any other type of processing. In addition to digital signal processing applications, the integrated circuit 150 may be used for computational, simulation, communication, storage, control, or any other application as demanded by the associated electronic system 160.

Figure 2:
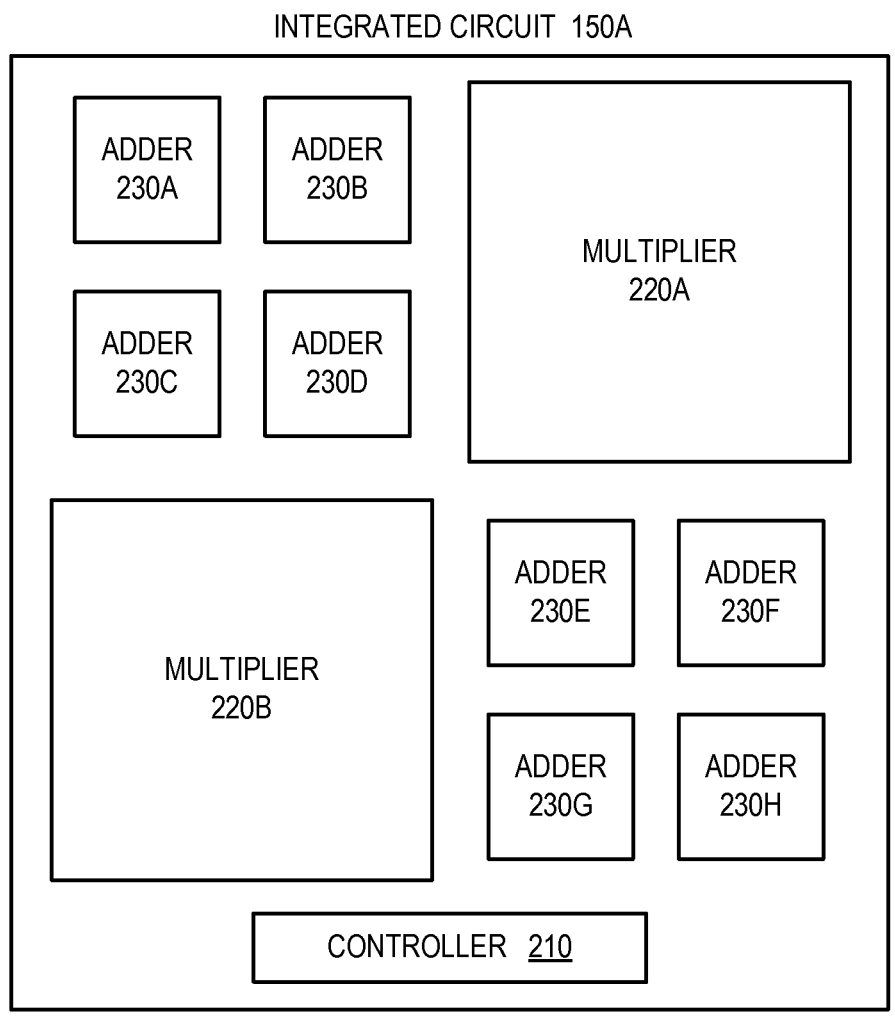
FIG. 2 is a block diagram illustrating the application of thermally aware scheduling and binding applied to a design for implementing an integrated circuit.

Turning now to FIG. 2, a block diagram illustrates the application of thermally aware scheduling and binding applied to a design for implementing an integrated circuit 150A, arranged according to one or more embodiments presented herein. The integrated circuit 150A of FIG. 2 is an illustrative example of the integrated circuit 150 of FIG. 1. The integrated circuit 150A can implement signal processing functions such as a Fast Fourier Transform (FFT) using eight adders 230A-230H and two multipliers 220A-220B. The eight adders 230A-230H may be referred to generally, or collectively, as adders 230. Similarly, the two multipliers 220A-220B may be referred to generally, or collectively, as multipliers 220. The multipliers 220 and the adders 230 are examples of modules, blocks, operators, or functional units within the integrated circuit 150. A controller 210 may implement a rotating schedule for applying the multipliers 220 and adders 230 to implementing the signal processing algorithm (e.g., the FFT algorithm in some examples).

Pluralities of multipliers 220 and adders 230 may be assembled to implement many signal processing algorithms. For example, digital filters can be implemented by multiplying input signal samples by coefficient values and adding, or accumulating, the results into the output signal. These multiply and accumulate (MAC) operations may be performed by collections of multipliers 220 and adders 230. These types of computational blocks may also be useful for various other signal processing algorithms such as encoding, decoding, convolution, neural networks, pattern matching, video processing, image processing, audio processing, medical imaging, radar, sonar, machine vision, motion tracking, three-dimensional imaging, pixel/image shading, video format conversion, and so forth.

The FFT algorithm can be implemented within the integrated circuit 150A by scheduling different operations on the available resources such as the multipliers 220 and adders 230. One possible version for binding and scheduling of the FFT algorithm onto the illustrated architecture may result in one multiplier 220A and three of the adders 230B, 230F, and 230H being heavily used in comparison to the other modules. During operation of the integrated circuit 150A, these heavily used modules may become hotter than the other modules resulting in hotspots and thermal gradients. Another possible version for binding and scheduling of the FFT algorithm onto the illustrated architecture results instead in the other multiplier 220B and three of the other adders 230A, 230C, and 230G being more heavily used.

Using techniques discussed herein, a controller 210 may be configured to rotationally schedule the selection and operation of the two different versions (e.g., the two different bindings for the specific algorithm/functions). The rotational schedule can support cycling through the two versions causing the heat on each module to be redistributed. Thus, the peak temperature of the overall integrated circuit 150A may be reduced. Empirical testing demonstrates the multiple version scheduling and binding technique discussed herein providing an average 6.35% decrease in the steady-state peak temperature.

Although described above in terms of two different versions, any other number of versions may also be possible such as three versions, four versions, etc. In some examples, the different versions may be physically separated to isolate the thermal energy between the different geographic regions of the integrated circuit. In some other examples, portions of the different versions may be interleaved with one another to spread the thermal energy across the integrated circuit over time. For example, adder 230A and 230D may be used in one version, while adder 230C and 230B may be used in another version, such that the thermal energy may be gradually spread across the integrated circuit. Combining thermally diverse versions can support reduced peak temperature, overall energy consumption, or leakage energy during operation of the integrated circuit.

Figure 3:
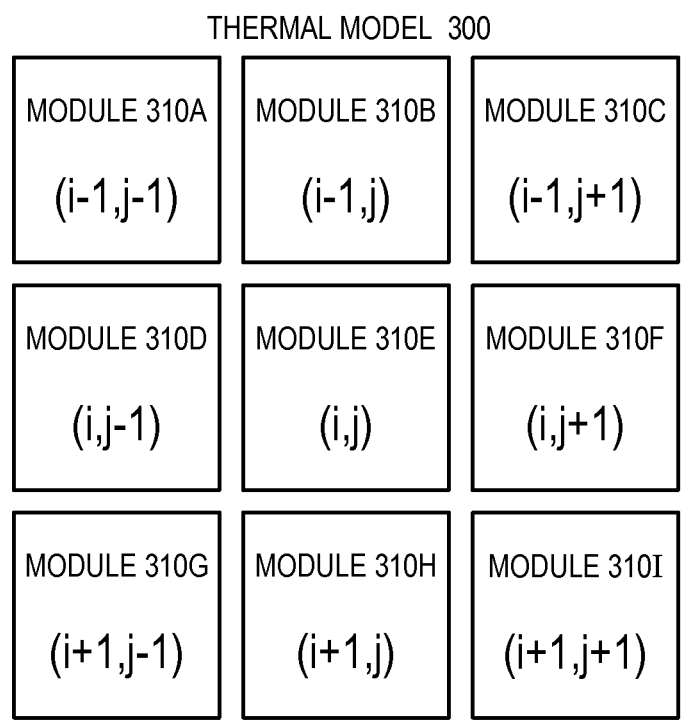
FIG. 3 is a schematic diagram illustrating a thermal model for neighboring modules within an integrated circuit.

Turning now to FIG. 3, a schematic diagram illustrates a thermal model 300 for neighboring modules 310A-310I within an integrated circuit 150, arranged according to one or more embodiments presented herein. The modules 310A-310I may be referred to generically, or collectively, as modules 310. A compact thermal model 300 may be used to calculate temperature rise within a particular binding and scheduling version. The thermal energy of each module 310 can be estimated from power consumed by activity within the module 310 along with energy exchanged with neighboring modules 310.

The model 300 can consider a steady thermal state for the integrated circuit 150 where produced thermal energy can be determined from energy transferred to the environment. In some examples, the model 300 may assume that the integrated circuit 150 is small relative to the environment. In such examples, the environment may not significantly change in temperature as a result of the thermal energy (e.g., the heat) from the integrated circuit 150. Some examples of the model 300 may also assume that the rate of thermal change within the integrated circuit 150 is considerably slower than clock frequencies affecting switching within the integrated circuit 150. Thus, energy consumption rates of a module 310 in a certain scheduling round may be considered a reasonable approximation of the long-term impact on the temperature of the integrated circuit 150 from that module 310.

The thermal model 300 may be based on Fourier conduction equations using constant thermal properties. A system, so defined, may be considered a linear elliptic boundary value problem. Elliptic boundary value problems may not be a function of time. Instead, such problems may be merely dependant on spatial variables.

Given the layout of the modules 310, as illustrated, the middle module 310E may be referred to with the index (i,j). As such, the middle module 310E may be said to have temperature $T_{i,j}$ and thermal energy $Q_{i,j}$. The middle module 310E shares boundaries with four modules 310B, 310D, 310F, and 310H. The thermal energy of each module may be exchanged with the four neighboring modules having shared boundaries. A slight modification may be introduced for edge modules 310 having only three neighboring modules 310 and one additional interface to the environment. Similarly, corner modules 310 may have only two neighbors and two boundaries interfacing with the environment. Based on the Fourier conduction equations, the thermal energy (Q) for the (i,j) module may be expressed as:

$$Q_{i,j} = k_{Si/env} * A_{Si/env} * (T_{i,j} - T_{env}) + \quad \text{(Eq. 1)}$$
$$k_{Si/Si} * A_{Si/Si} * (T_{i,j} - T_{i,j-1}) + k_{Si/Si} * A_{Si/Si} * (T_{i,j} - T_{i,j+1}) +$$
$$k_{Si/Si} * A_{Si/Si} * (T_{i,j} - T_{i-1,j}) + k_{Si/Si} * A_{Si/Si} * (T_{i,j} - T_{i+1,j}),$$

where $T_{env}$ is the temperature of the environment, $k_{Si/Si}$ is the heat coefficient between two modules supported on silicon, $k_{Si/env}$ is the heat coefficient between silicon and the environment, $A_{Si/Si}$ is the area coefficient between two modules supported on silicon, and $A_{Si/env}$ is the area coefficient between silicon and the environment.

Figure 4:
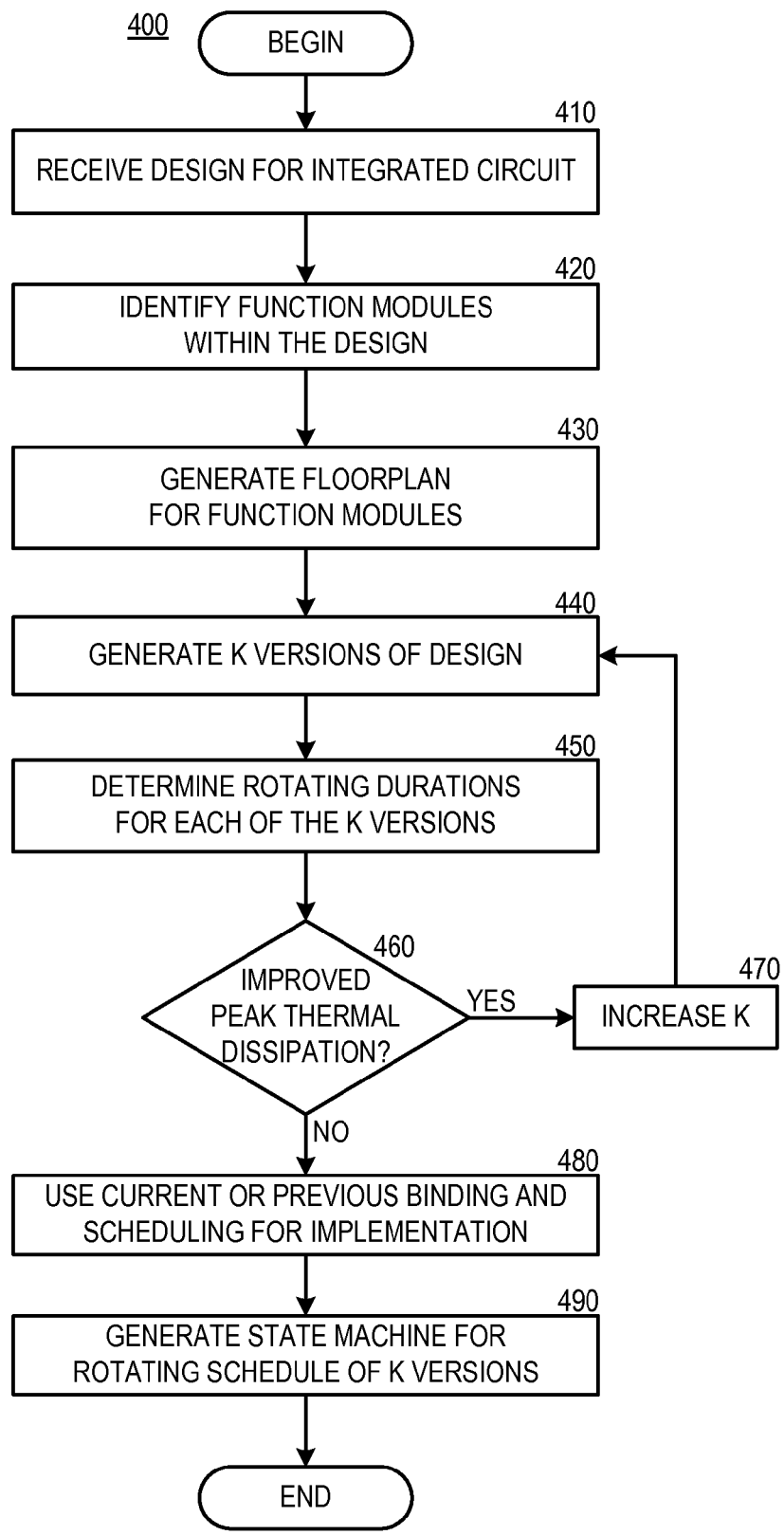
FIG. 4 is a flow diagram illustrating a process for multiversion scheduling and binding.

Referring now to FIG. 4, additional details will be provided regarding the embodiments presented herein for hardware synthesis using thermally aware scheduling and binding. In particular, FIG. 4 is a flow diagram illustrating a process 400 for multiversion scheduling and binding according to at least some embodiments presented herein. Process 400 may include one or more operations, functions or actions as illustrated by one or more of blocks 410, 420, 430, 440, 450, 460, 470, 480 and/or 490.

It should be appreciated that the blocks described herein may be implemented as a sequence of computer implemented instructions or program modules running on a computing system, as interconnected machine logic circuits or circuit modules within the computing system, or some combination thereof. The implementation is a matter of choice dependent on the performance and other requirements of the various embodiments. Some of the logical operations described herein are referred to variously as state operations, functions, structural devices, actions, or modules. These operations, functions, structural devices, actions and modules may be implemented in software, in firmware, in special purpose digital logic, and any combination thereof. It should also be appreciated that in some implementations one or more of the illustrated blocks may be eliminated, combined or separated into additional blocks than those shown in the figures and described herein. These blocks may also be performed sequentially, in parallel, or in a different order than those described herein.

The process 400 may begin at block 410 (Receive Design for Integrated Circuit). Block 410 may be followed by block 420 (Identify Function Modules with the Design). Block 420 may be followed by block 430 (Generate Floorplan for Function Modules). Block 430 may be followed by block 440 (Generate K Versions of Design). Block 440 may be followed by block 450 (Determine Rotating Durations for Each of the K Versions). Block 450 may be followed by decision block 460 (Improved Peak Thermal Dissipation). Decision block 460 may be followed by block 470 (Increase K) when the decision block determines that the peak thermal dissipation has improved (Yes). Block 470 may be followed by block 440. Decision block 460 may be followed by block 480 (Use Current or Previous Binding and Scheduling for Implementation) when the decision block determines that the peak thermal dissipation has failed to improve (No). Block 480 may be followed by block 490 (Generate State Machine for Rotating Schedule of K Versions). After block 490 processing may terminate. Further details about each block will be described below.

At block 410 (Receive Design for Integrated Circuit), the thermally aware scheduling and binding module 110 executing on a computer 10 can be configured to receive a design for implementing an integrated circuit 150. The integrated circuits design can be expressed in a high-level description such as a hardware description language, a programming language, a data flow graph (DFG), a net list, a behavioral description, an architectural description, any other hardware description, or any combination thereof.

At block 420 (Identify Function Modules within the Design), a computer 10 executing the thermally aware scheduling and binding module 110 can be configured to identify modules 310 within the design received at block 410. The modules 310 may be computational blocks, operators, functional units, or other elements within an integrated circuit 150. For example, in the signal processing (e.g., FFT) integrated circuit 150A discussed above, the modules 310 include the multipliers 220 and the adders 230.

The types of modules 310 within the design can be identified from the operations present within the high-level description of the design. A lower bound on each type of module 310 may be determined as the minimum number of that type of module 310 needed to implement the design. According to embodiments, a list scheduling approach may be used to identify the lower bound. List scheduling can find an approximate minimum of the number of modules 310 of a given type while maintaining a critical path timing constraint. Such an approach can be beneficial in signal processing applications where a critical data path delay cannot be changed without affecting throughput and throughput needs to remain constant.

The number of each type of module 310 used in the actual design may be determined from the operations or functions within the design. The number of each type of module 310 used can be selected to be equal to, or greater than, the lower bound that was determined. Meeting or exceeding the lower bound can support meeting the timing requirements of the design.

At block 430 (Generate Floorplan for Function Modules), a floorplanner may be configured to position the modules 310 identified at block 420 within the integrated circuit 150. The placement of elements within an integrated circuit may be referred to as floorplanning The floorplanner can be configured to position each of the modules 310 according to coordinates on a grid, such as the (i,j) indexes discussed with respect to the thermal model 300. The floorplanner may be software code executed as part of the thermally aware scheduling and binding module 110 executing on the computer 10.

A force-directed floorplanner may be configured to position similar resources as far away from each other as possible within the floorplan of the integrated circuit 150. Such positioning can increase the number of alternate module binding versions where peak operating temperatures may be differently located, or diverse, between the versions. The versions can be more likely to be thermally diverse with respect to the location of peak operating temperature.

At block 440 (Generate K Versions of Design), the thermally aware scheduling and binding module 110 executing on the computer 10 can be configured to select a quantity K of the possible scheduling and binding versions available within the floorplan. The K versions can be selected such that the selected versions have the smallest peak thermal energy dissipation. A linear programming (LP) technique may be employed in performing the selection. The LP technique can adopt a maximally constrained, minimally constraining heuristic such that oppositely associated pairs of heavily and lightly used modules of a given type may be used to thermally offset one another. In some examples an objective may be to generate versions that have different activities on different resources.

The maximally constrained, minimally constraining heuristic can be configured to select a center resource for each type of module 310. The center resource may be the most frequently used modules of that type within the version. A priority may then be assigned to each module 310.

For example, a priority pair $(p_r, n_r)$ may be assigned to each module 310. The center resource of each type of module 310 may be assigned a highest priority $(p_r=1)$. This may be said to maximally constrain the design. The further a module 310 is from the center resource of the same module type, the lower priority, or larger value of $p_r$, the resource may be assigned. Ties having the same value for $p_r$ may be broken by the number of neighbors $n_r$. Modules 310 with a smaller value of $n_r$ can have a higher priority thus minimally constraining the design.

Operations within the design may be assigned, or bound, to modules 310 within the integrated circuit 150 in order of priority. For example, a multiplication operation within the signal processing (e.g., FFT, etc.) discussed above may be assigned to either multiplier 220A or multiplier 220B according to the associated priority pair $(p_r, n_r)$. The operations may also be assigned according to a data path associated with the design. It should be appreciated that the versions may be generated by differing the data path among the versions, differing the control flow between the versions, altering any other design parameter between the versions, or any combination thereof.

At block 450 (Determine Rotating Durations for Each of the K Versions), durations for operating each of the K versions may be determined by the thermally aware scheduling and binding module 110 executing on the computer 10. A linear programming (LP) technique may be employed to determine the durations for each version. The LP technique may seek to maintain both area and timing constraints. The LP technique may also attempt to minimize the peak operating temperature of the integrated circuit.

According to some embodiments, the LP may seek an objective function in light of one or more constraints. For example, an objective function may be to substantially minimize the peak, or maximum, temperature on the integrated circuit 150.

One constraint may relate to local Newton heat laws. For example, the expression for thermal energy $Q_{i,j}$ discussed above (see Eq. 1) in the thermal model 300 may be used for each of the modules 310.

A second constraint may relate to local thermal energy generation as a function of the schedules. Thermal energy $(Q_{i,j})$ can be expressed as:

$$Q_{i,j}=d_1{}^*P_1+d_2{}^*P_2+d_3{}^*P_3+\ldots+d_k{}^*P_k \quad \text{(Eq. 2),}$$

where $P_k$ is a constant representing the average power generated by the modules 310 at coordinates (i,j) in version k and $d_k$ is a duration ration denoting the fraction of time that version k is scheduled to operate during each rotation.

A third constraint may relate to global constraints on the maximum temperature on the grid. Each module temperature $(T_{i,j})$ may not exceed the maximum temperature $(T_{max})$ of the integrated circuit 150.

$$T_{i,j} \leq T_{max} \quad \text{(Eq. 3)}$$

A fourth constraint can impose unity on the duration ratios as follows:

$$d_1+d_2+d_3+d_k=1 \quad \text{(Eq. 4)}$$

At decision block 460 (Improved Peak Thermal Dissipation), process 400 may determine if the most recent set of K rotating versions improves peak thermal dissipation using the thermally aware scheduling and binding module 110 executing on the computer 10. If not, then improvement related to increasing K may have reached diminishing marginal returns.

Block 470 (Increase K) follows block 460 when it was determined at block 460 that the most recent set of K rotating versions did improve peak thermal dissipation. At block 470 (Increase K), K may be increased in an attempt to further improve peak thermal dissipation. K may be increased (or incremented) by one or by some other specified step size other than one. From block 470, processing may loop back to block 440 to retest the thermally aware scheduling and binding using the increased value for K.

Block 480 (Use Current or Previous Binding and Scheduling for Implementation) follows block 460 when it was determined at block 460 that the most recent set of K rotating versions did not improve peak thermal dissipation. At block 480 (Use Current or Previous Binding and Scheduling for Implementation), the current set of K versions may be implemented into the hardware synthesis. As it was determined that the most recent set of K rotating versions did not improve peak thermal dissipation, the previous set of K rotating versions may be alternatively be implemented.

At block 490 (Generate State Machine for Rotating Schedule of K Versions), a small controller may be configured for implementing the K version rotating scheduler and assignment. An example low-overhead implementation for the rotational K version controller can be based upon a Finite State Machine (FSM). An FSM may be constructed as $F_r$ starting as the schedule from a first one of the versions $F_1$. A log K quantity of extra inputs for $F_r$ may be added to $F_1$ to be used as a key to select a particular one of the K versions. The key may be denoted as $I_{key}$. The number of outputs of $F_r$ can be the same as the number of outputs of $F_1$. A mapping function may be constructed $O_r=g(I_{key}, O_1)$, where $O_r$ is the output of $F_r$ and $O_1$ is the output of $F_1$. If the output of the $k^{th}$ version of the FSM for the schedule is $O_k$, O can be assigned from $O_k$ if key equals k. The circuit can then be generated and added to the output of $F_1$ to create $F_r$. $F_r$ may then be connected to a rotation controller that generates the current schedule to be used at a given time.

Figure 5:
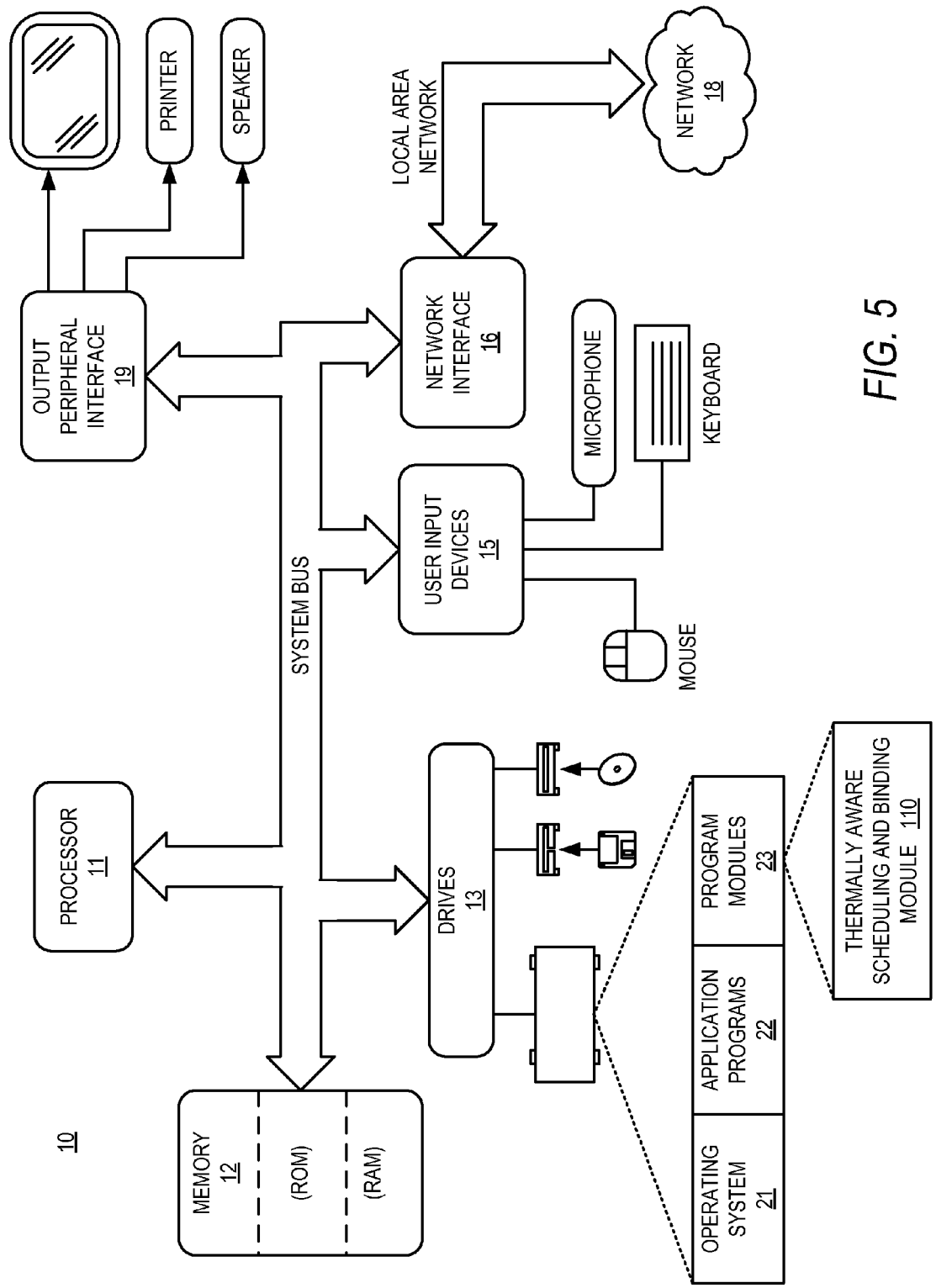
FIG. 5 is a block diagram illustrating an example computing system.

With reference to FIG. 5, an example computing system for implementing various embodiments presented herein will be discussed. The computing system includes a computer 10 as briefly discussed with respect to FIG. 1. The computer 10 may include a processor 11, a memory 12 and one or more drives 13. The drives 13 and their associated computer storage media may provide storage of computer readable instructions, data structures, program modules 23 and other data for the computer 10. The computing system may be adapted to support embodiments for implementing hardware synthesis using thermally aware scheduling and binding. For example, the computing system may comprise program modules 23 such as the thermally aware scheduling and binding module 110 previously described herein. Various embodiments may include computers, dedicated hardware, or embedded computing systems.

The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multicore processor 120, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support parallel dynamic optimization leveraging multicore processors as discussed herein.

The drives 13, other storage devices, or their associated computer-readable storage media may store an operating system 21, application programs 22, and program modules 23. The computer 10 may include user input devices 15 through which a user may enter commands and data. Input devices may include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices may be coupled to processor 11 through a user input interface that is coupled to a system bus. The input devices may also be coupled by other interface and bus structures, such as a parallel port, game port or a universal serial bus (USB). Computers such as computer 10 may also include other peripheral output devices such as speakers, which may be coupled through an output peripheral interface 19 or similar interface.

The computer 10 may operate in a networked environment using logical connections to one or more computers, such as a remote computer coupled to network interface 16. The remote computer may be a personal computer, a server, a router, a network PC, a peer device, or other common network node. The remote computer may include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be coupled to the LAN through a network interface 16 or a network adapter. When used in a WAN networking environment, the computer 10 may include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 may perform hardware synthesis using thermally aware scheduling and binding in accordance with various embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 for performing hardware synthesis using thermally aware scheduling and binding. The program modules 23 may include software instructions that, when loaded into the processor 11 and executed, transform a general-purpose computing system into a special-purpose computing system customized to facilitate all, or part of, the thermally aware scheduling and binding techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 12 transitions between states, thereby transforming the transistors or other circuit elements constituting the processor 11 from a first machine to a second machine, wherein the second machine may be specifically configured to support hardware synthesis using thermally aware scheduling and binding. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 6:
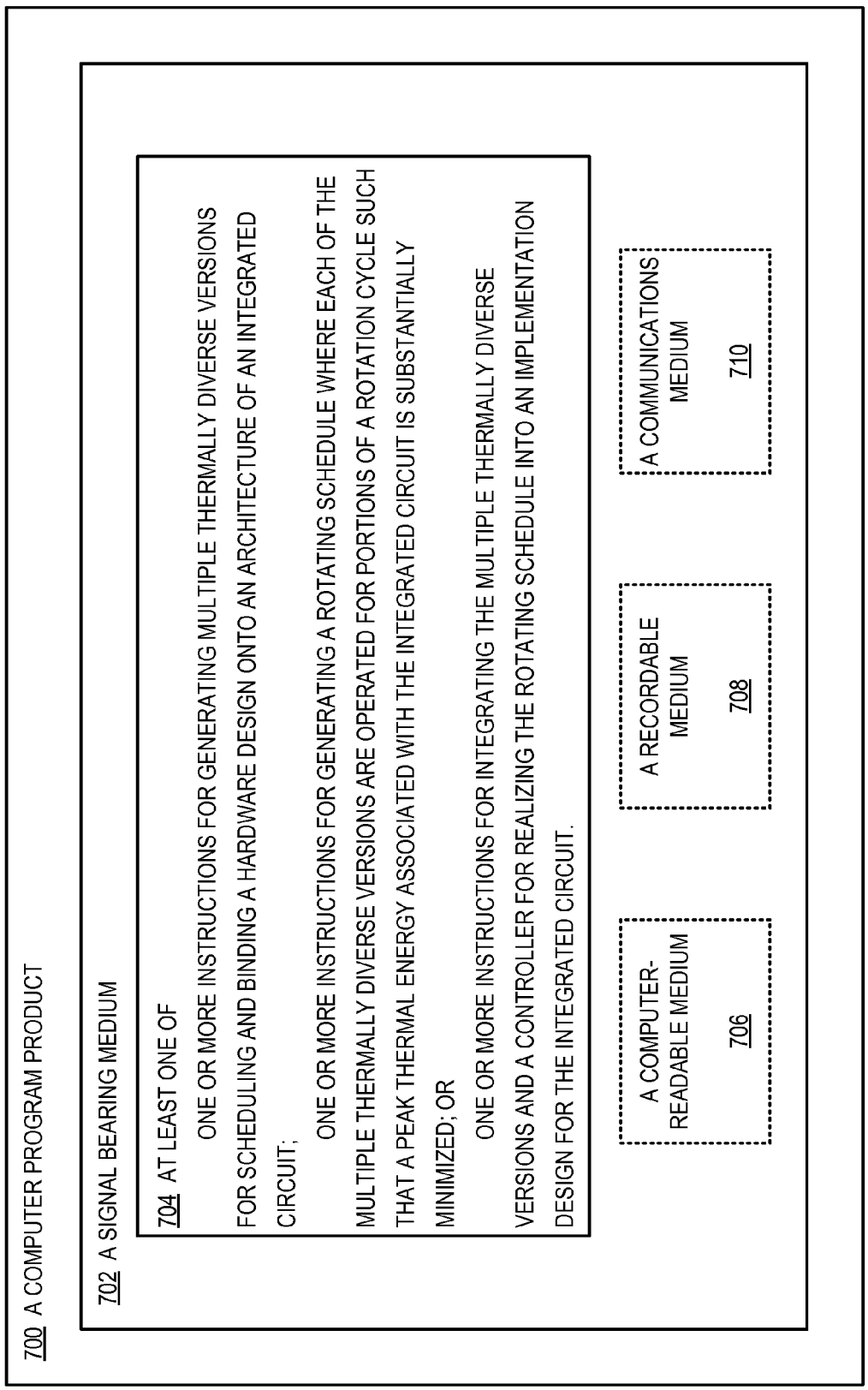
FIG. 6 is a schematic illustrating a partial view of a computer program product that includes a computer program for executing a computer process on a computing device, all arranged according to at least some embodiments presented herein.

Turning now to FIG. 6, a schematic illustrates a partial view of a computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for generating multiple thermally diverse versions for scheduling and binding a hardware design onto an architecture of an integrated circuit; one or more instructions for generating a rotating schedule where each of the multiple thermally diverse versions are operated for portions of a rotation cycle such that a peak thermal energy associated with the integrated circuit is substantially minimized; or one or more instructions for integrating the multiple thermally diverse versions and a controller for realizing the rotating schedule into an implementation design for the integrated circuit. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. An integrated circuit comprising:
   a first version of a module to implement a function, wherein operation of the first version results in a first thermal energy pattern for the integrated circuit;
   a second version of the module to implement the function, wherein operation of the second version results in a second thermal energy pattern for the integrated circuit;
   wherein the first thermal energy pattern and the second thermal energy pattern are thermally diverse with respect to one another; and
   a controller coupled to the first and second versions of the module and configured to implement a rotating schedule to select operation of the first version and the second version, wherein each of the first and second versions are operated for respective portions of the rotating schedule.

2. The integrated circuit of claim 1 wherein the controller is configured to implement the rotating schedule to reduce a peak operating temperature of the integrated circuit as compared to a peak operating temperature of another schedule of operation of the first and second version.

3. The integrated circuit of claim 1 wherein the controller is configured to implement the rotating schedule to reduce a peak thermal energy of the integrated circuit as compared to a peak thermal energy of another schedule of operation of the first and second version.

4. The integrated circuit of claim 1 wherein the controller is configured to implement the rotating schedule to reduce a peak power consumption of the integrated circuit as compared to a peak power consumption of another schedule of operation of the first and second version.

5. The integrated circuit of claim 1 wherein the first version is positioned away from the second version on the integrated circuit.

6. The integrated circuit of claim 1 wherein the first version has a first data path, the second version has a second data path, and the second data path differs from the first data path.

7. The integrated circuit of claim 1 wherein both the first version and the second version comprise adders and multipliers configured to perform the function.

8. The integrated circuit of claim 1 wherein the first version of the module is configured to implement a signal processing algorithm and the second version of the module separately is configured to implement the signal processing algorithm.

9. The integrated circuit of claim 1 wherein the controller is configured to select either the first version of the module or the second version of the module for operation only during a respective fractional duration of a rotation cycle.

10. The integrated circuit of claim 1 wherein the controller includes a finite state machine.

11. The integrated circuit of claim 1 wherein the respective portions of the operating schedule maintain a timing constraint associated with signal processing operations.

12. The integrated circuit of claim 1, further comprising a third version of the module to implement the function, and wherein operation of the third version results in a third thermal energy pattern for the integrated circuit, and wherein the controller is configured to implement the rotating schedule for the first, second, and third versions, and each version is operated for respective portions of the rotating schedule.

13. The integrated circuit of claim 1 wherein the first version and the second version comprise a part of a number of versions of the module to implement the function, and wherein the number reduces a peak temperature associated with the integrated as compared to a peak operating temperature of an integrated circuit operating only a single version of the module.

14. The integrated circuit of claim 1 wherein the first version and the second version comprise a part of a number of versions of the module to implement the function, and wherein the number reduces a peak thermal energy of the integrated circuit as compared to a peak thermal energy of an integrated circuit operating only a single version of the module.

15. An integrated circuit, comprising:
   a first version of a module which performs a function, wherein operation of the first version results in a first thermal energy pattern for the integrated circuit, the first version configured to operate for a first period of time; and
   a second version of the module, the second circuit performing the function, wherein operation of the second version results in a second thermal energy pattern for the integrated circuit, the second version configured to operate for a second period of time, the second thermal energy pattern being thermally diverse with respect to the first thermal energy pattern; and
   wherein the first version and the second version are configured to operate alternately to at least one of reduce a peak operating temperature of the integrated circuit, reduce a peak thermal energy of the integrated circuit, reduce a peak power consumption of the integrated circuit, or spread thermal energy generated by the modules across the integrated circuit.

16. The integrated circuit of claim 15 wherein the first version is positioned away from the module of the second version on the integrated circuit.

17. The integrated circuit of claim 15 wherein the first version has a first data path, the second version has a second data path, and the second data path differs from the first data path.

18. The integrated circuit of claim 15 wherein the first period of time and the second period of time maintain a timing constraint associated with signal processing operations.

19. The integrated circuit of claim 15 wherein both the first version and the second version comprise adders and multipliers configured to perform the function.

20. The integrated circuit of claim 15 wherein the first period of time for operation of the first version and the second period of time for operation of the second version operate to reduce a peak operating temperature of the integrated circuit.

* * * * *

UNITED STATES PATENT AND TRADEMARK OFFICE
CERTIFICATE OF CORRECTION

PATENT NO.        : 8,656,338 B2
APPLICATION NO.   : 13/751811
DATED             : February 18, 2014
INVENTOR(S)       : Koushanfar et al.

It is certified that error appears in the above-identified patent and that said Letters Patent is hereby corrected as shown below:

On the Title Page

On Page 2, in Item (56), under "OTHER PUBLICATIONS", in Column 1, Line 21, delete "optimization." and insert -- optimization, --, therefor.

On Page 2, in Item (56), under "OTHER PUBLICATIONS", in Column 2, Lines 8-9, delete "Conference on Comp[uter aided Design (ICCAD '07)," and insert -- International Conference on Computer Aided Design (ICCAD '07), IEEE/ACM --, therefor.

On Page 2, in Item (56), under "OTHER PUBLICATIONS", in Column 2, Line 20, delete "281 {288," and insert -- 281-288, --, therefor.

On Page 2, in Item (56), under "OTHER PUBLICATIONS", in Column 2, Line 21, delete "foorplanning" and insert -- floorplanning --, therefor.

In the Specification

In Column 7, Line 9, delete "floorplanning" and insert -- floorplanning. --, therefor.

In Column 9, Line 32, delete "processor 120," and insert -- processor, --, therefor.

In Column 10, Line 1, delete "networks" and insert -- wide area networks --, therefor.

In Column 10, Line 58, delete "processor 12" and insert -- processor 11 --, therefor.

Signed and Sealed this
Twenty-fourth Day of June, 2014

Michelle K. Lee
*Deputy Director of the United States Patent and Trademark Office*